United States Patent
Tsubokura

(10) Patent No.: US 8,384,843 B2
(45) Date of Patent: Feb. 26, 2013

(54) LIQUID CRYSTAL DISPLAY DEVICE

(75) Inventor: Masaki Tsubokura, Mobara (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 324 days.

(21) Appl. No.: 12/649,430

(22) Filed: Dec. 30, 2009

(65) Prior Publication Data

US 2010/0171901 A1    Jul. 8, 2010

(30) Foreign Application Priority Data

Jan. 7, 2009  (JP) .................................. 2009-001515

(51) Int. Cl.
*G02F 1/1333* (2006.01)

(52) U.S. Cl. ........................................................ 349/60
(58) Field of Classification Search ........................ 349/60
See application file for complete search history.

(56) References Cited

U.S. PATENT DOCUMENTS

| | | | |
|---|---|---|---|
| 5,870,160 A | 2/1999 | Yanagawa et al. | |
| 2002/0149571 A1* | 10/2002 | Roberts | 345/174 |
| 2003/0184514 A1 | 10/2003 | Grosfeld | |
| 2004/0212583 A1* | 10/2004 | Cobian | 345/156 |
| 2005/0212991 A1 | 9/2005 | Sugawara | |
| 2006/0066772 A1 | 3/2006 | Takahashi et al. | |
| 2007/0188675 A1 | 8/2007 | Tsubokura et al. | |

FOREIGN PATENT DOCUMENTS

| | | |
|---|---|---|
| JP | 08-262992 | 10/1996 |
| JP | 09-258203 | 10/1997 |
| JP | 2003-296023 | 10/2003 |
| JP | 2005-275103 | 10/2005 |
| JP | 2006-91710 | 4/2006 |
| JP | 2007-212649 | 8/2007 |
| JP | 2007-212652 | 8/2007 |

* cited by examiner

*Primary Examiner* — Timothy L Rude
(74) *Attorney, Agent, or Firm* — Antonelli, Terry, Stout & Kraus, LLP.

(57) ABSTRACT

An object of the invention is to reduce the effect of moisture on the inside of a liquid crystal display device. The liquid crystal display device includes a liquid crystal display panel in which a display surface including a display area is disposed upright, a first frame including an aperture opposed to the display area, disposed leaving a space between it and the display surface of the liquid crystal display panel, and a rail-shaped member extending in a horizontal direction affixed to the display surface of the liquid crystal display panel, below the display area, in such a way that it does not come into contact with the first frame.

6 Claims, 11 Drawing Sheets

LIQUID CRYSTAL DISPLAY DEVICE

The present application claims priority from Japanese application JP2009-001515 filed on Jan. 7, 2009, the content of which is hereby incorporated by reference into this application.

BACKGROUND OF THE INVENTION

1. Technical Field

The present invention relates to a liquid crystal display device.

2. Related Art

A liquid crystal display device with a structure wherein a frame covers a peripheral portion of a liquid crystal display portion is known (refer to JP-A-2007-212649 and JP-A-2007-212652 (related U.S. Patent Application US2007/0188675A). With this structure, in order not to affect the display on the liquid crystal display panel, the frame does not come into contact with the liquid crystal display panel. That is, a gap is formed between the liquid crystal display panel and the frame.

As it may happen that moisture intrudes from the gap between the liquid crystal display panel and the frame when carrying out cleaning of the liquid crystal display device, or the like, a countermeasure is necessary.

SUMMARY OF THE INVENTION

The invention has an object of reducing the effect of moisture on the inside of the liquid crystal display device.

1. A liquid crystal display device according to an embodiment of the invention includes a liquid crystal display panel in which a display surface including a display area is disposed upright, a frame including an aperture opposed to the display area, disposed leaving a space between it and the display surface of the liquid crystal display panel, and a rail-shaped member extending in a horizontal direction affixed to the display surface of the liquid crystal display panel, below the display area, in such a way that it does not come into contact with the frame. According to the embodiment, as it is possible to stop water rolling down the display surface of the liquid crystal display panel with the rail-shaped member, it is possible to reduce the effect of moisture on the inside of the liquid crystal display device.

2. With the liquid crystal display device described in 1., it is acceptable that the rail-shaped member is affixed only in a position in which it is not opposed to the frame.

3. With the liquid crystal display device described in 2., it is acceptable that the rail-shaped member includes a first plate section affixed to the display surface, and a second plate section rising up from the lower end of the first plate section, and that cross-sectional surfaces intersecting in a longitudinal direction form an L shape.

4. With the liquid crystal display device described in 3., it is acceptable that the rail-shaped member further includes a third plate section extending downward from the second plate section, and that the third plate section covers an edge of the frame, including the lower side of the aperture.

5. With the liquid crystal display device described in any one of 2. to 4., it is acceptable that it further includes a rail-shaped elastic body extending in a horizontal direction affixed to the surface of the frame opposing the display surface, in a position below the rail-shaped member, in such a way as to leave a space between itself and the display surface of the liquid crystal display panel.

6. With the liquid crystal display device described in 1., it is acceptable that the rail-shaped member includes a first portion which extends in a horizontal direction in such a way that it does not oppose the frame, and a second portion which extends in a horizontal direction opposing the frame.

7. With the liquid crystal display device described in 6., it is acceptable that the first portion is formed in such a way that its height above the display surface is greater than the space between the display surface and the frame.

8. With the liquid crystal display device described in 1., it is acceptable that the rail-shaped member includes a groove which extends in a horizontal direction on its top surface.

9. With the liquid crystal display device described in 8., it is acceptable that the rail-shaped member is affixed only in a position in which it is opposed to the frame.

10. A liquid crystal display device according to an embodiment of the invention includes a liquid crystal display panel in which a display surface including a display area is disposed upright, a flexible wiring substrate attached in such a way as to be electrically connected to the liquid crystal display panel, a frame including an aperture opposed to the display area, disposed leaving a space between it and the display surface of the liquid crystal display panel, and a rail-shaped silicone resin extending in a horizontal direction provided on an electrical connector of the liquid crystal panel and flexible wiring substrate in such a way that it does not come into contact with the frame. According to the embodiment, as it is possible to stop water rolling down the display surface of the liquid crystal display panel with the rail-shaped silicone resin, it is possible to reduce the effect of moisture on the inside of the liquid crystal display device.

11. A liquid crystal display device according to an embodiment of the invention includes a liquid crystal display panel in which a display surface including a display area is disposed upright, a flexible wiring substrate attached in such a way as to be electrically connected to the liquid crystal display panel, and a frame including an aperture opposed to the display area, disposed leaving a space between it and the display surface of the liquid crystal display panel. The liquid crystal display panel including a polarizing plate opposing the frame, the polarizing plate is formed in such a way that it extends to a position in which it covers the flexible wiring substrate in a horizontal direction. According to the embodiment, as water running down the display surface of the liquid display panel runs down the surface of the polarizing plate, and flows lower than the flexible wiring substrate, there is no effect of moisture on the flexible wiring substrate.

12. A liquid crystal display device according to an embodiment of the invention includes a liquid crystal display panel in which a display surface including a display area is disposed upright, a frame including an aperture opposed to the display area, disposed leaving a space between it and the display surface of the liquid crystal display panel, a rail-shaped first water repellent member extending in a horizontal direction affixed to the surface of the liquid crystal display panel opposing the frame, in a position opposing the frame, in such a way that it does not come into contact with the frame, and a rail-shaped second water repellent member extending in a horizontal direction affixed to the surface of the frame opposing the display surface, in a position opposing the display surface, in such a way that it does not come into contact with the display surface. The first water repellent member and second water repellent member include mutually opposing portions, with a space between them. According to the embodiment, as the flow of water running down the display surface of the liquid crystal display panel is regulated by the first water repellent member and second water repellent member, it is possible to reduce the effect of moisture on the inside of the liquid crystal display device.

13. A liquid crystal display device according to an embodiment of the invention includes a liquid crystal display panel in which a display surface including a display area is disposed upright, a first frame including an aperture opposed to the display area, disposed leaving a space between it and the display surface of the liquid crystal display panel, a second frame disposed on the side of the liquid crystal display panel opposite to that of the first frame, a flexible wiring substrate, attached to the liquid crystal display panel in such a way as to be electrically connected, pulled below the liquid crystal display panel between the first frame and second frame, a rail-shaped first elastic body extending in a horizontal direction affixed to the surface of the first frame opposing the flexible wiring substrate, and a rail-shaped second elastic body extending in a horizontal direction affixed to the surface of the second frame opposing the flexible wiring substrate. The flexible wiring substrate is sandwiched between the first elastic body and second elastic body. According to the embodiment, as it is possible to stop the flow of water rolling down the display surface of the liquid crystal display panel with the first elastic body and second elastic body, it is possible to reduce the effect of moisture on the inside of the liquid crystal display device.

14. A liquid crystal display device according to an embodiment of the invention includes a liquid crystal display panel in which a display surface including a display area is disposed upright, a frame including an aperture opposed to the display area, disposed leaving a space between it and the display surface of the liquid crystal display panel, and a light transmissive substrate attached to the surface of the frame on the side opposite to that of the liquid crystal display panel in such a way as to block the aperture. According to the embodiment, it is possible to prevent moisture intruding from the gap between the liquid crystal display panel and frame with the light transmissive substrate.

DETAILED DESCRIPTION OF THE INVENTION

Figure 1:
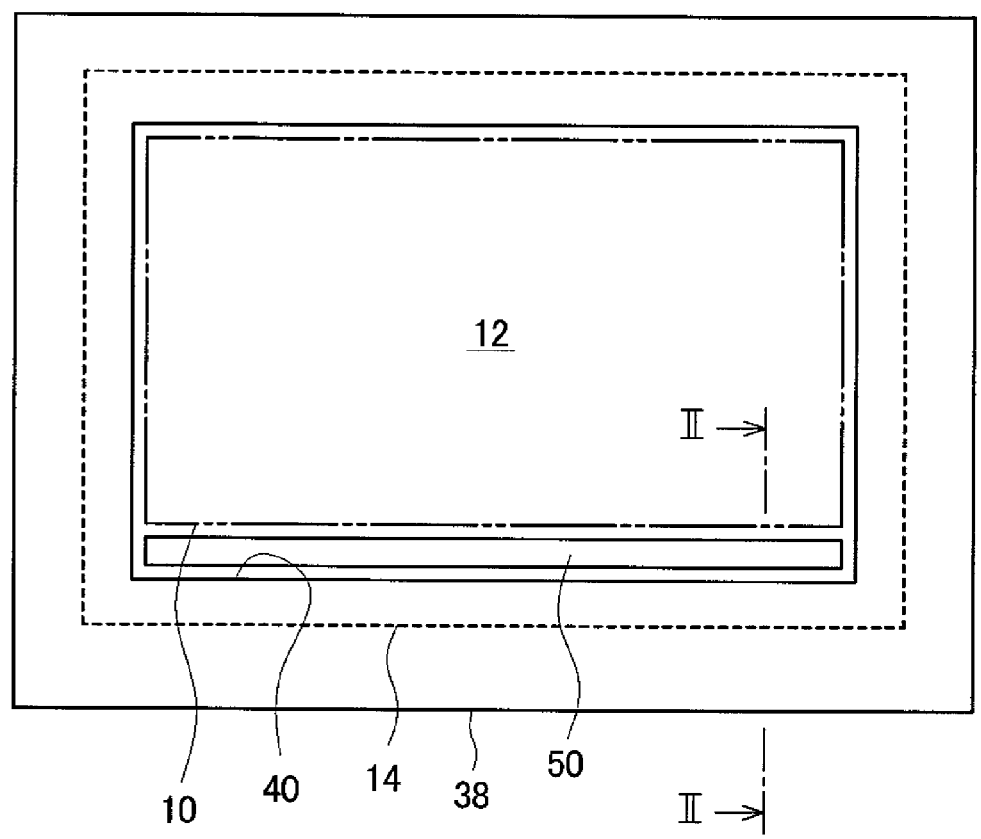
FIG. 1 is a front view showing a liquid crystal display device according to a first embodiment of the invention.

Hereafter, a description will be given, referring to the drawings, of embodiments of the invention.

<First Embodiment>

Figure 2:
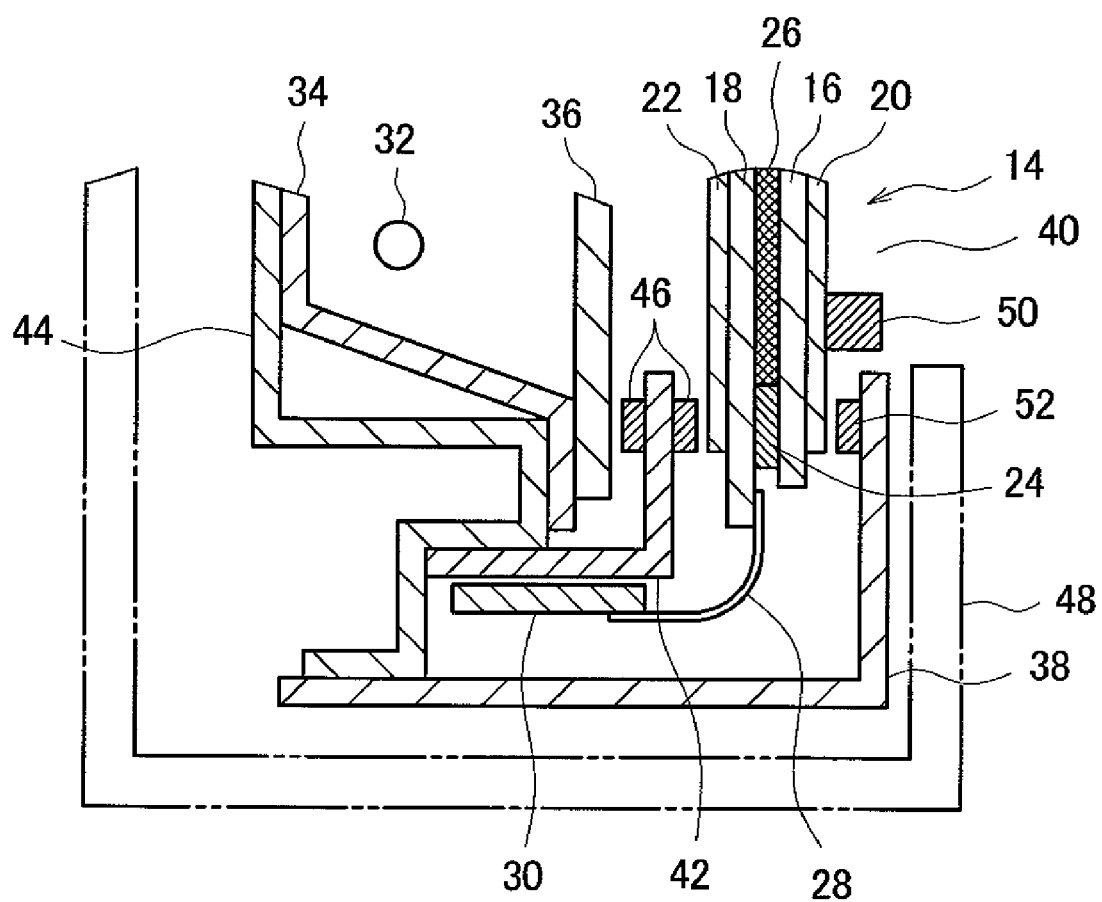
FIG. 2 is a sectional view along the line II-II of the liquid crystal display device shown in FIG. 1.

FIG. 1 is a front view showing a liquid crystal display device according to a first embodiment of the invention. FIG. 2 is a sectional view along the line II-II of the liquid crystal display device shown in FIG. 1.

The liquid crystal display device includes a liquid crystal display panel 14 in which a display surface 12 including a display area 10 is disposed upright. The liquid crystal display panel 14 includes a first substrate 16 and a second substrate 18. The first substrate 16 and second substrate 18, being, for example, glass substrates, have a light transmittivity. The first substrate 16 and second substrate 18 are disposed in such a way as to oppose each other with a space between them. One of the first substrate 16 and second substrate 18 is a color filter substrate including an unshown colored layer, while the other is a TFT substrate on which an unshown thin film transistor (TFT) is formed. A first polarizing plate 20 is affixed to the first substrate 16, while a second polarizing plate 22 is affixed to the second substrate 18. A surface of the first polarizing plate 20 is the display surface 12.

Matching ends of the first substrate 16 and second substrate 18 are fixed with a sealing material 24 made of, for example, epoxy resin. Liquid crystal 26 is enclosed in a space between the first substrate 16 and second substrate 18 surrounded by the sealing material 24. It being acceptable that a drive method of the liquid crystal 26 is any method of an in-plane switching (IPS) method, a twisted nematic (TN) method, a vertical alignment (VA) method, or the like, electrodes and wiring (not shown) in accordance with the method are formed.

A flexible wiring substrate 28 is electrically connected to the liquid crystal display panel 14. Specifically, a terminal (not shown) of the liquid crystal display panel 14 and a terminal (not shown) of the flexible wiring substrate 28 are electrically connected. The flexible wiring substrate 28 is led, flexed, below the liquid crystal display panel 14, and behind the liquid crystal display panel 14 (in the opposite direction to the display surface 12).

The flexible wiring substrate 28 is electrically connected to a circuit substrate 30. The circuit substrate 30 is disposed below the liquid crystal display panel 14. An IC chip (not shown) with a built-in drive circuit, or the like, being mounted on the flexible wiring substrate 28, a control circuit (not shown) controlling the IC chip, and wiring connecting the IC chip, are formed on the circuit substrate 30.

A light source 32 (for example, a fluorescent tube) and a reflecting plate 34 are disposed behind the liquid crystal display panel 14 (on the second substrate 18 side). An optical sheet 36, such as a light diffuser plate, is disposed between the liquid crystal display panel 14 and the light source 32.

The liquid crystal display device includes a first frame 38. The first frame 38, being disposed leaving a space between it and the display surface 12 (the first substrate 16 or the first polarizing plate 20) of the liquid crystal display panel 14, opposes the first polarizing plate 20. The first frame 38 can be called the upper frame or outer frame. The first frame 38 includes an aperture 40 opposite the display area 10. The display area 10 is positioned inside the aperture 40.

The liquid crystal display device includes a second frame 42. The second frame 42 is disposed on the side of the liquid crystal display panel 14 opposite to that of the first frame 38. That is, the liquid crystal display panel 14 is positioned between the first frame 38 and second frame 42. The second frame 42 can be called the middle frame or inner frame. The liquid crystal display panel 14, light source 32, reflecting plate 34, and optical sheet 36 are supported by the first frame 38 and second frame 42. The outer peripheral edge of the liquid crystal display panel 14 is disposed between the first frame 38 and second frame 42. The flexible wiring substrate 28 is pulled below the liquid crystal display panel 14 between the first frame 38 and second frame 42.

Furthermore, a cover 44 is provided in such a way as to cover the liquid crystal display panel 14, light source 32, reflecting plate 34, and optical sheet 36. The cover 44 can be called the lower frame. The reflecting plate 34 and optical sheet 36 are supported sandwiched between the second frame 42 and cover 44. Cushioning material 46 is interposed between the second frame 42 and optical sheet 36, and between the liquid crystal display panel 14 and second frame 42.

The liquid crystal display panel 14 includes a plurality of signal lines (not shown), each of which extends in the vertical direction of the display area 10, and includes a plurality of scanning lines (not shown), each of which extends in the horizontal direction of the display area 10. The unshown signal lines are electrically connected to the IC chip (not shown) mounted on the flexible wiring substrate 28.

It is acceptable that the liquid crystal display device further includes a cabinet 48. That is, it is acceptable that the liquid crystal display panel 14, first frame 38, and the like, are housed in the cabinet 48.

In the embodiment, a rail-shaped member 50 is affixed to the display surface 12 of the liquid crystal display panel 14. The rail-shaped member 50 extends in a horizontal direction below the display area 10. The rail-shaped member 50 does not come into contact with the first frame 38. The rail-shaped member 50 is affixed only in a position in which it is not opposed to the first frame 38.

According to the embodiment, as it is possible to stop water rolling down the display surface 12 of the liquid crystal display panel 14 with the rail-shaped member 50 when cleaning, or the like, it is possible to reduce the effect of moisture on the inside of the liquid crystal display device.

A rail-shaped elastic body 52, extending in a horizontal direction, is affixed to the surface of the first frame 38 opposing the display surface 12. The elastic body 52 is made of rubber, or the like. The elastic body 52 is affixed in a position below the rail-shaped member 50, in such a way as to leave a space between itself and the display surface 12 of the liquid crystal display panel 14. Even in the event that the first frame 38 is pushed by an external force, the shock is absorbed by the elastic body 52 without the first frame 38 coming into direct contact with the liquid crystal display panel 14, meaning that it is possible, due to the elastic body 52, to minimize the effect on the liquid crystal display panel 14.

Other details of the liquid crystal display device according to the embodiment are the same as details of heretofore known liquid crystal display devices. Also, a manufacturing method of the liquid crystal display device includes a process evident from the heretofore described configuration, and a heretofore known process.

<<Modification Example 1>>

Figure 3:
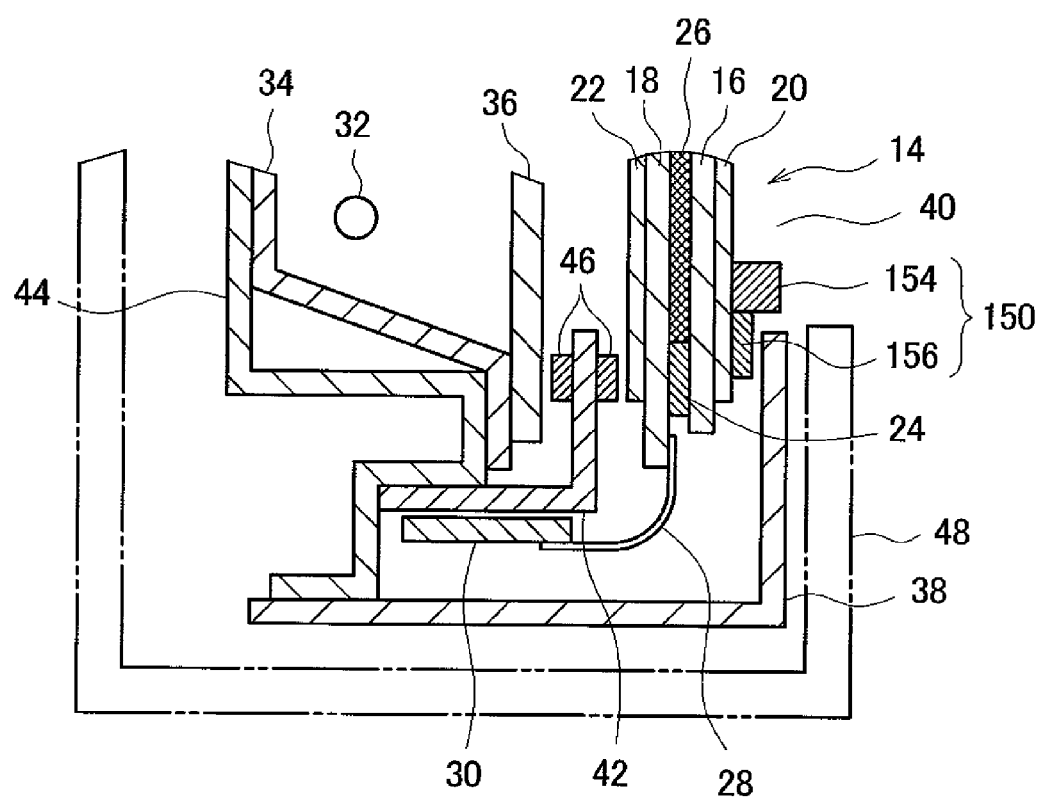
FIG. 3 is a diagram illustrating a modification example 1 of the liquid crystal display device according to the first embodiment.

FIG. 3 is a diagram illustrating a modification example 1 of the liquid crystal display device according to the first embodiment. In the modification example 1, a rail-shaped member 150 includes a first portion 154 which extends in a horizontal direction in such a way that it does not oppose the first frame 38. Furthermore, the rail-shaped member 150 includes a second portion 156 which extends in a horizontal direction opposing the first frame 38. The second portion 156 is under the first portion 154. The first portion 154 is formed in such a way that its height above the display surface 12 is greater than the space between the display surface 12 and first frame 38. Consequently, the first portion 154 covers the gap between the display surface 12 and first frame 38, thus preventing the intrusion of water and dirt. However, as there is a gap between the rail-shaped member 150 and first frame 38, it does not happen that force is applied from the first frame 38 through the rail-shaped member 150. Other details of the modification example 1 are the same as the details described in the heretofore described first embodiment.

<<Modification Example 2>>

Figure 4:
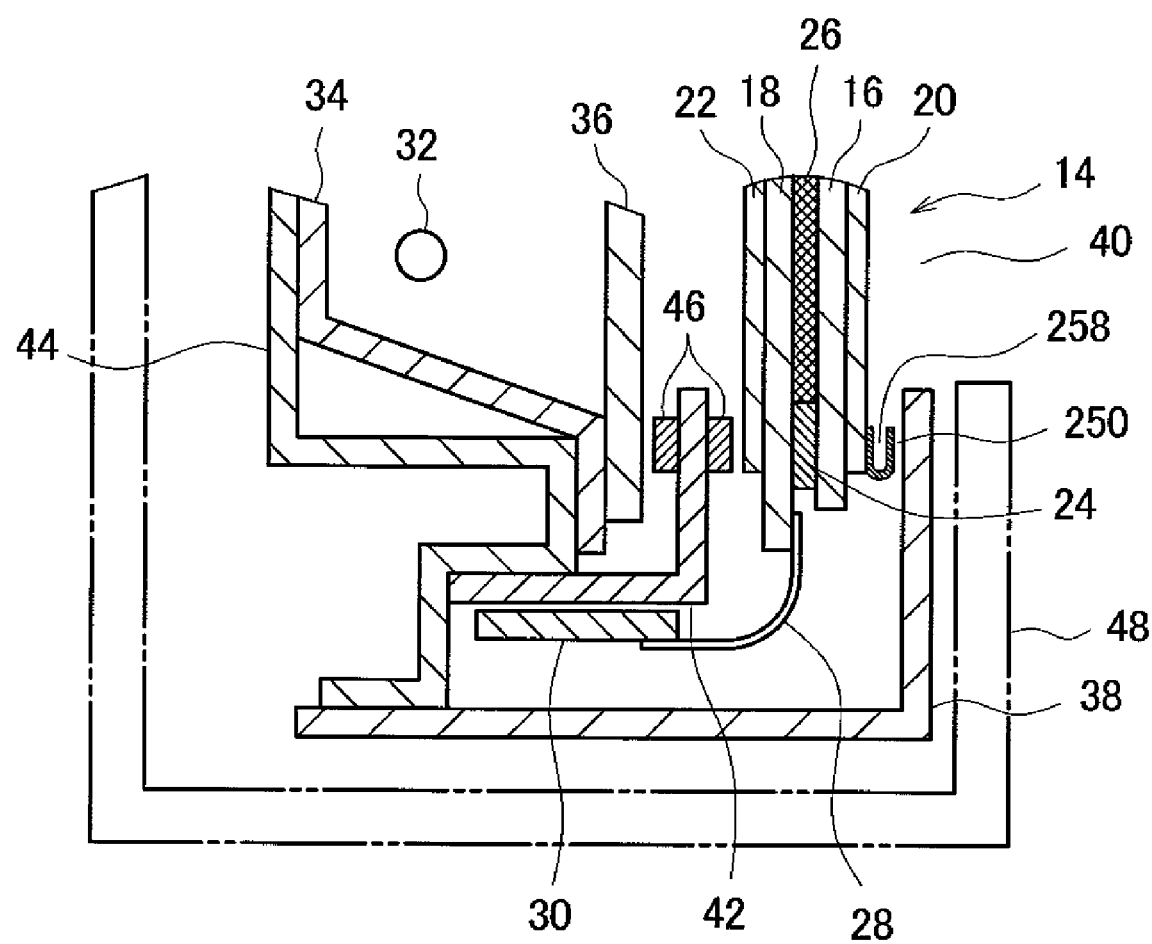
FIG. 4 is a diagram illustrating a modification example 2 of the liquid crystal display device according to the first embodiment.

FIG. 4 is a diagram illustrating a modification example 2 of the liquid crystal display device according to the first embodiment. In the modification example 2, a rail-shaped member 250 includes a groove 258 which extends in a horizontal direction on its top surface, and the groove 258 performs the role of a gutter. By disposing the rail-shaped member 250 in such a way that the groove 258 inclines to one side, it is possible to accumulate water on the one side, and it is acceptable to form an unshown drain outlet in the rail-shaped member 250. In the example of FIG. 4, the rail-shaped member 250 is affixed only in a position in which it is opposed to the first frame 38, but it is also acceptable that it is affixed in a position in which it is not opposed to the first frame 38 (inside the aperture 40). Other details of the modification example 2 are the same as the details described in the heretofore described first embodiment.

<<Modification Example 3>>

Figure 5:
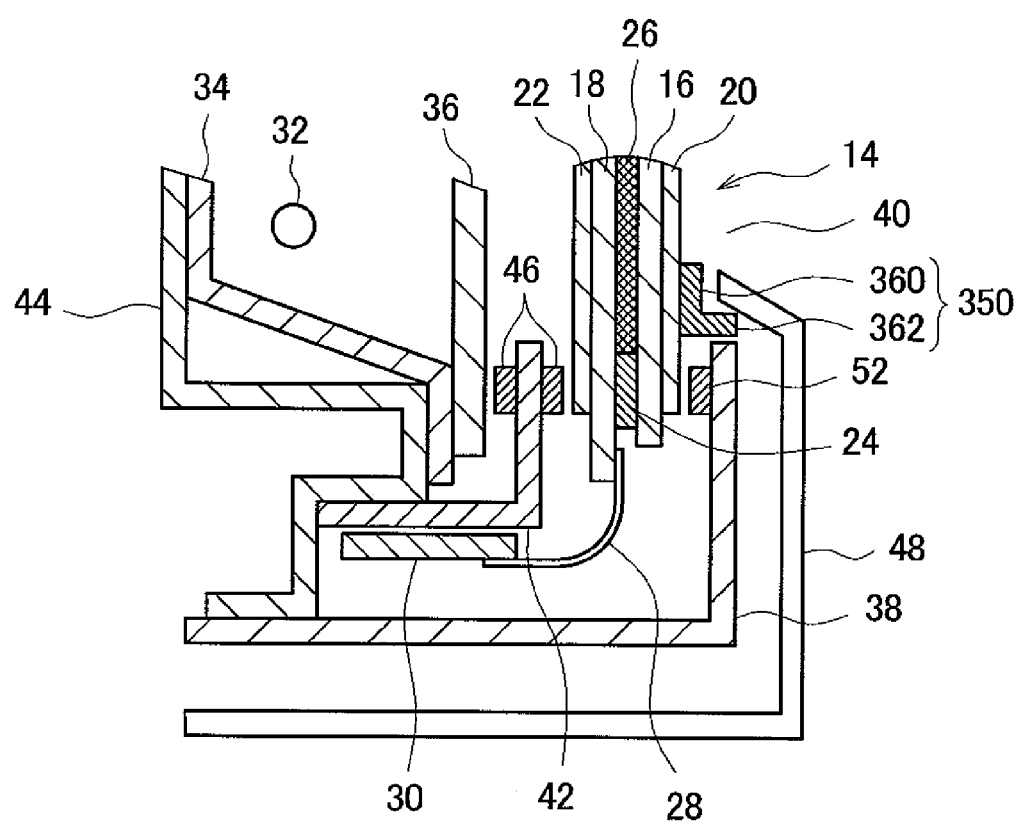
FIG. 5 is a diagram illustrating a modification example 3 of the liquid crystal display device according to the first embodiment.

FIG. 5 is a diagram illustrating a modification example 3 of the liquid crystal display device according to the first embodiment. In the modification example 3, a rail-shaped member 350 is configured in such a way that cross-sectional surfaces intersecting in a longitudinal direction form an L shape. In detail, the rail-shaped member 350 includes a first plate section 360 affixed to the display surface 12, and further includes a second plate section 362 rising up from the lower end of the first plate section 360. As the cross-section is L-shaped, a depression is formed in the rail-shaped member 350, and it is acceptable to insert an edge of a cabinet 148 into the depression.

The rail-shaped member 350 is disposed inside the aperture 40 of the first frame 38. The second plate section 362 covers the gap between the display surface 12 and first frame 38, thus preventing the intrusion of water and dirt. However, as there is a gap between the rail-shaped member 350 and first frame 38, it does not happen that force is applied from the first frame 38 through the rail-shaped member 350. Other details of the modification example 3 are the same as the details described in the heretofore described first embodiment.

<<Modification Example 4>>

Figure 6:
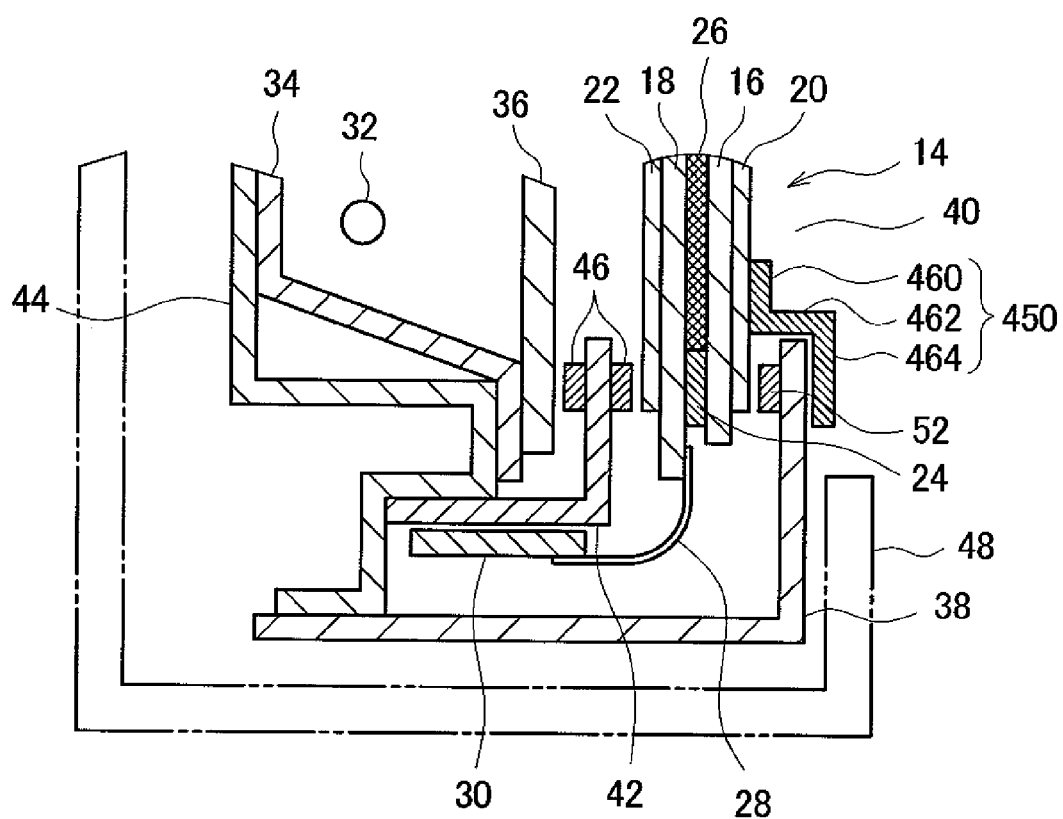
FIG. 6 is a diagram illustrating a modification example 4 of the liquid crystal display device according to the first embodiment.

FIG. 6 is a diagram illustrating a modification example 4 of the liquid crystal display device according to the first embodiment. In the modification example 4, a rail-shaped member 450 includes a first plate section 460 affixed to the display surface 12, and a second plate section 462 rising up from the lower end of the first plate section 460. Furthermore, the rail-shaped member 450 includes a third plate section 464 extending downward from the second plate section 462. The third plate section 464 covers an edge of the first frame 38, including the lower side of the aperture 40.

There is a gap between the rail-shaped member 450 and first frame 38, but as the gap between the third plate section 464 and first frame 38 opens downward, it is extremely difficult for water to intrude. Other details of the modification example 4 are the same as the details described in the heretofore described first embodiment.

<Second Embodiment>

Figure 7:
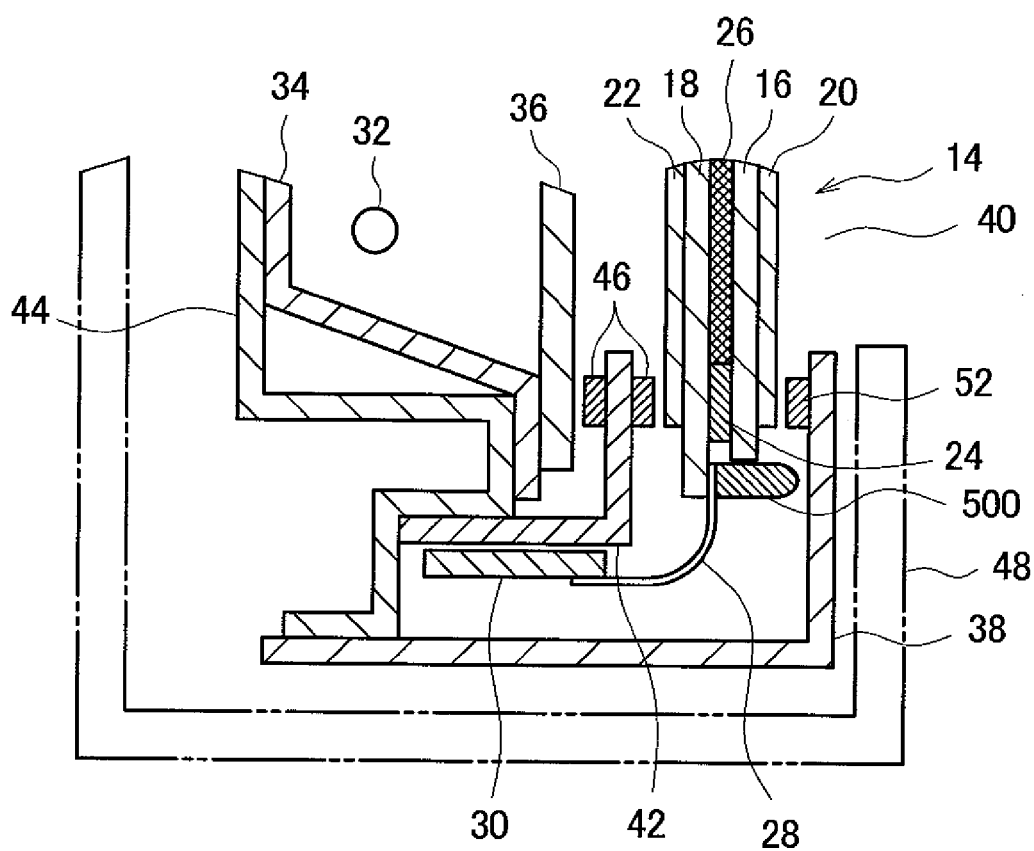
FIG. 7 is a sectional view of a liquid crystal display device according to a second embodiment of the invention.

FIG. 7 is a sectional view of a liquid crystal display device according to a second embodiment of the invention. The liquid crystal display device according to the embodiment includes, in place of the rail-shaped member 50 and elastic body 52 described in the first embodiment, a rail-shaped silicone resin 500 which extends in a horizontal direction. The silicone resin 500, being provided on an electrical connector of the liquid crystal panel 14 and flexible wiring substrate 28, doubles as a protective member for the electrical connector.

The silicone resin 500 does not come into contact with the first frame 38. Other details of the second embodiment are the same as the details described in the heretofore described first embodiment.

According to the embodiment, as it is possible to stop water rolling down the display surface 12 of the liquid crystal display panel 14 with the rail-shaped silicone resin 500, it is possible to reduce the effect of moisture on the inside of the liquid crystal display device.

<Third Embodiment>

Figure 8:
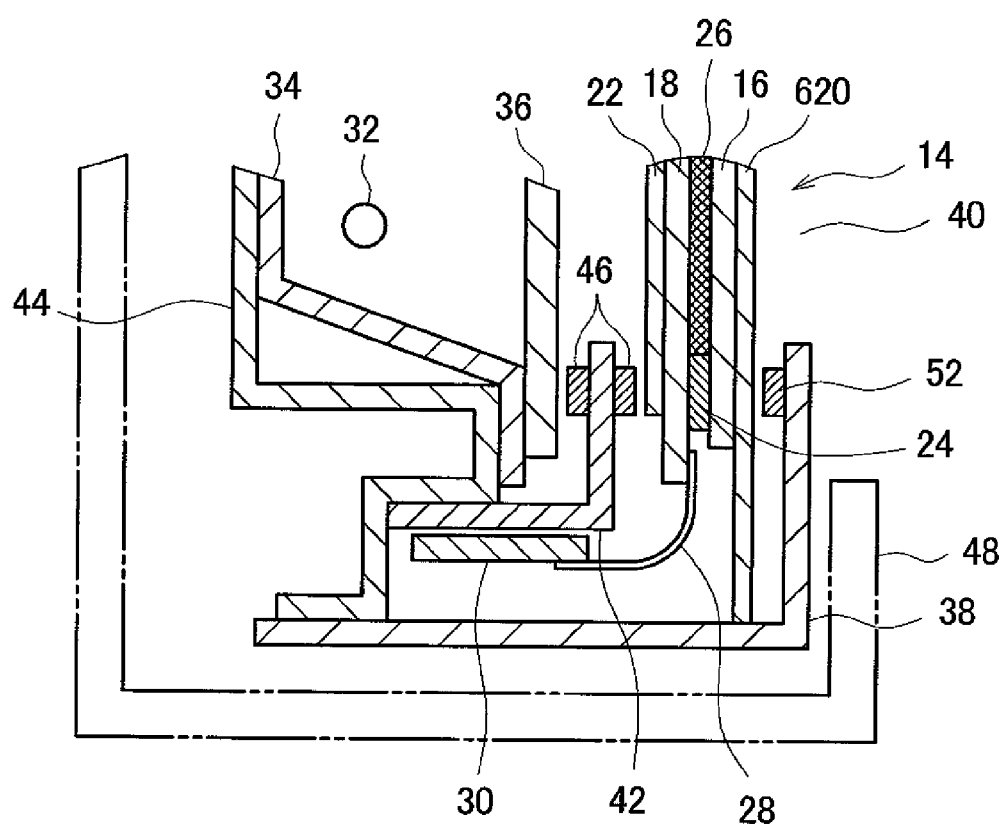
FIG. 8 is a sectional view of a liquid crystal display device according to a third embodiment of the invention.

FIG. 8 is a sectional view of a liquid crystal display device according to a third embodiment of the invention. In the embodiment, a first polarizing plate 620 is formed in such a way that it extends to a position in which it covers the flexible wiring substrate 28 in a horizontal direction. Although the rail-shaped member 50 and elastic body 52 shown in FIG. 1 are omitted in the example shown in FIG. 8, it is also acceptable that they are provided.

According to the embodiment, as water running down the display surface 12 of the liquid crystal display panel 14 runs down the surface of the first polarizing plate 620, and flows lower than the flexible wiring substrate 28, there is no effect of moisture on the flexible wiring substrate 28, or on the circuit substrate 30 electrically connected thereto. Other details of the third embodiment are the same as the details described in the heretofore described first embodiment.

<Fourth Embodiment>

Figure 9:
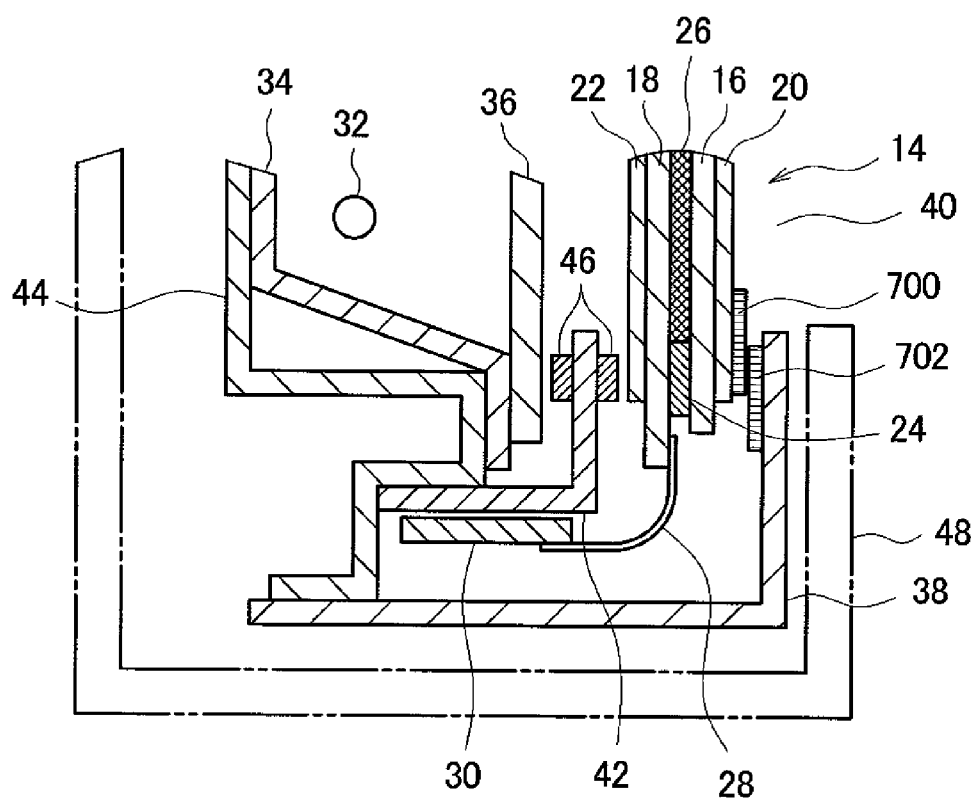
FIG. 9 is a sectional view of a liquid crystal display device according to a fourth embodiment of the invention.

FIG. 9 is a sectional view of a liquid crystal display device according to a fourth embodiment of the invention. The liquid crystal display device according to the embodiment includes, in place of the rail-shaped member 50 and elastic body 52 described in the first embodiment, a first water repellent member 700 and a second water repellent member 702, each made of silicone rubber, Teflon (registered trademark), or the like.

The first water repellent member 700 is of a rail shape extending in a horizontal direction. The first water repellent member 700 is affixed to the surface of the liquid crystal display panel 14 opposed to the first frame 38, in a position opposing the first frame 38, in such a way that it does not come into contact with the first frame 38. The second water repellent member 702 is of a rail shape extending in a horizontal direction. The second water repellent member 702 is affixed to the surface of the first frame 38 opposed to the display surface 12, in a position opposing the display surface 12, in such a way that it does not come into contact with the display surface 12.

The first water repellent member 700 and second water repellent member 702 include mutually opposing portions, with a space between them. Although there is a gap between the first water repellent member 700 and second water repellent member 702, the water repellent action of the two means that it is difficult for water to enter into the gap.

According to the embodiment, as the flow of water running down the display surface 12 of the liquid crystal display panel 14 is regulated by the first water repellent member 700 and second water repellent member 702, it is possible to reduce the effect of moisture on the inside of the liquid crystal display device. Other details of the fourth embodiment are the same as the details described in the heretofore described first embodiment.

<Fifth Embodiment>

Figure 10:
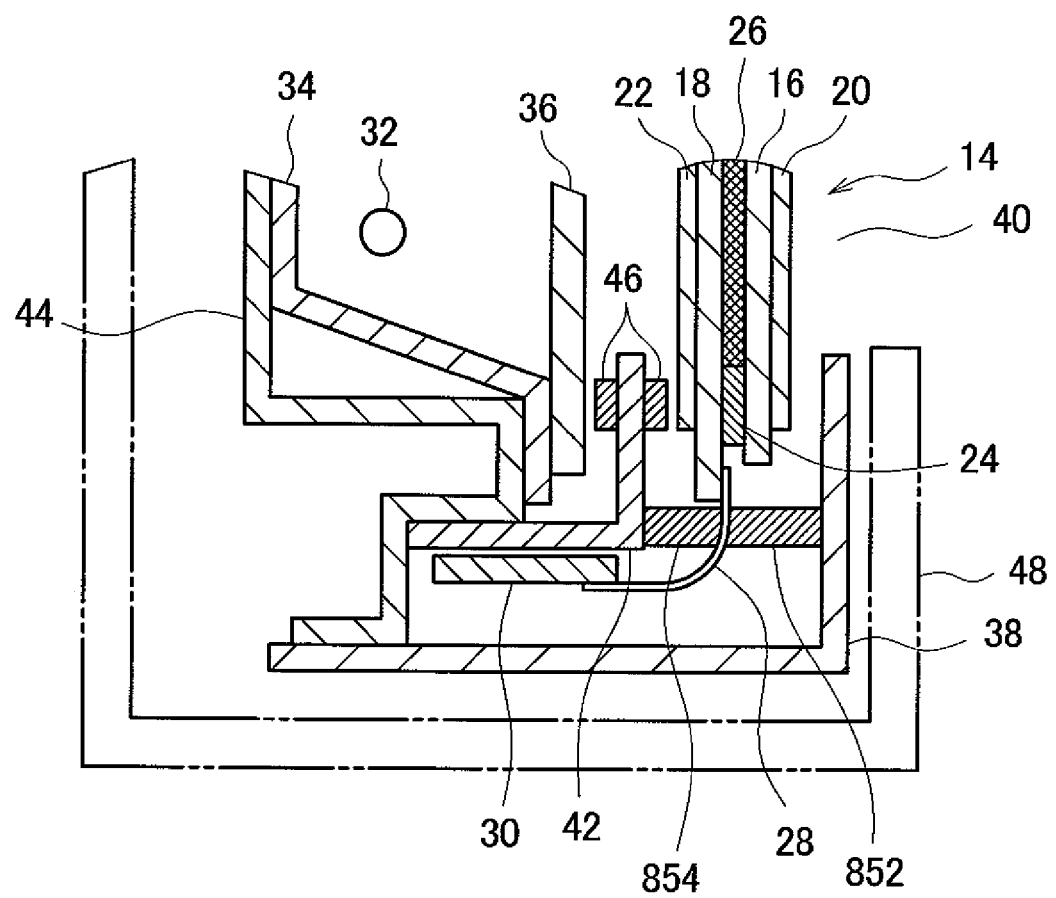
FIG. 10 is a sectional view of a liquid crystal display device according to a fifth embodiment of the invention.

FIG. 10 is a sectional view of a liquid crystal display device according to a fifth embodiment of the invention. The liquid crystal display device according to the embodiment includes, in place of the rail-shaped member 50 and rail-shaped elastic body 52 described in the first embodiment, a first elastic body 852 and second elastic body 854, each made of rubber, or the like. The first elastic body 852, being of a rail shape extending in a horizontal direction, is affixed to the surface of the first frame 38 opposed to the flexible wiring substrate 28. The second elastic body 854, being of a rail shape extending in a horizontal direction, is affixed to the surface of the second frame 42 opposed to the flexible wiring substrate 28.

The flexible wiring substrate 28 is sandwiched between the first elastic body 852 and second elastic body 854. According to the embodiment, as the flow of water running down the display surface 12 of the liquid crystal display panel 14 is stopped by the first elastic body 852 and second elastic body 854, it is possible to reduce the effect of moisture on the inside of the liquid crystal display device. Other details of the fifth embodiment are the same as the details described in the heretofore described first embodiment.

<Sixth Embodiment>

Figure 11:
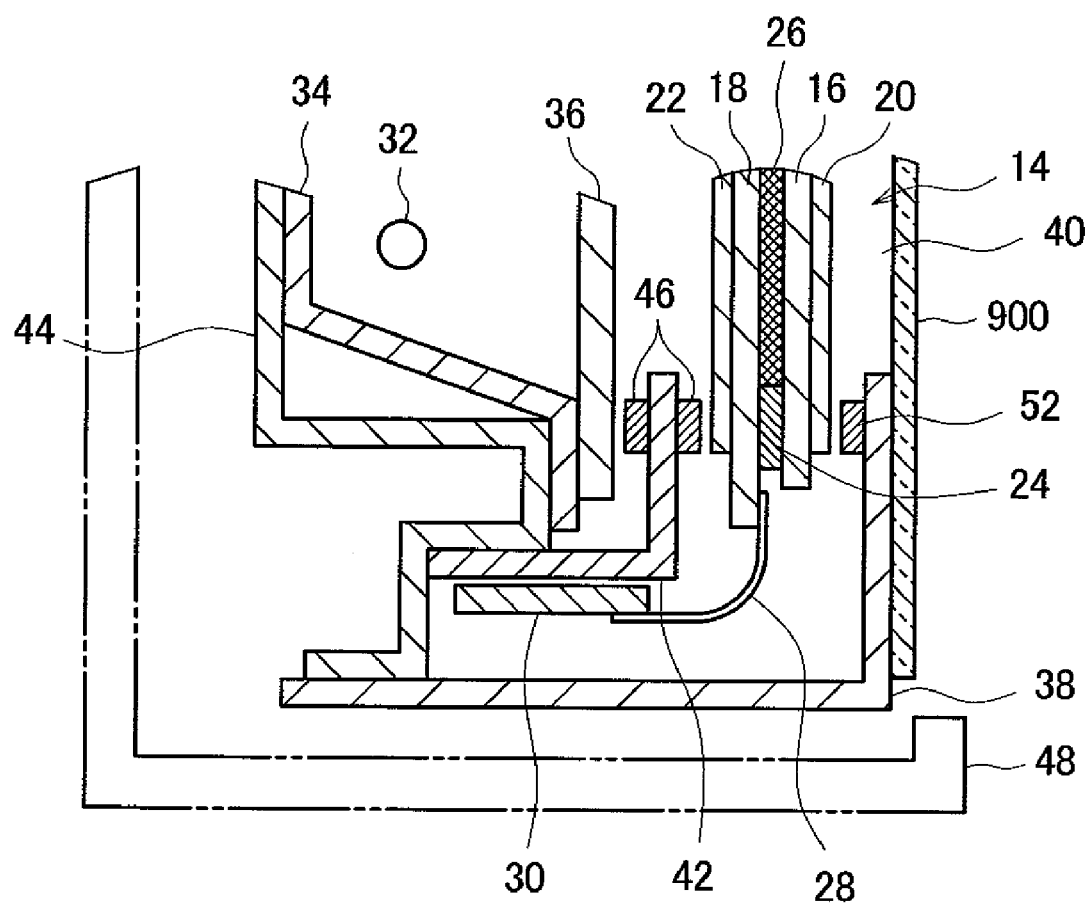
FIG. 11 is a sectional view of a liquid crystal display device according to a sixth embodiment of the invention.

FIG. 11 is a sectional view of a liquid crystal display device according to a sixth embodiment of the invention. The liquid crystal display device according to the embodiment includes a light transmissive substrate 900 attached to the surface of the first frame 38 on the side opposite to that of the liquid crystal display panel 14 in such a way as to block the aperture 40. According to the embodiment, it is possible to prevent moisture intruding from the gap between the liquid crystal display panel 14 and first frame 38 with the light transmissive substrate 900. Other details of the sixth embodiment are the same as the details described in the heretofore described first embodiment.

The invention not being limited to the heretofore described embodiments, various modifications are possible. For example, it is possible to replace the configurations described in the embodiments with a configuration which is essentially the same, a configuration which accomplishes the same effect, or a configuration which can achieve the same object.

What is claimed is:

1. A liquid crystal display device comprising:
  a liquid crystal display panel in which a display surface including a display area is disposed upright;
  a frame including an aperture opposed to the display area, disposed leaving a space between an inner surface of the frame and the display surface of the liquid crystal display panel; and
  a rail-shaped member extending in a horizontal direction and affixed to the display surface of the liquid crystal display panel, below the display area, in such a way that no portion of the rail-shaped member comes into contact with the frame, the rail-shaped member is affixed only in a position in which no portion of the rail-shaped member is opposed to the inner surface of the frame; and
  a rail-shaped elastic body extending in the horizontal direction and affixed to the inner surface of the frame opposing the display surface, in a position below the rail-shaped member, in such a way as to leave a space between the rail-shaped elastic body and the display surface of the liquid crystal display panel.

2. The liquid crystal display device according to claim 1, wherein
the rail-shaped member including a first plate section affixed to the display surface, and a second plate section rising up from the lower end of the first plate section, cross-sectional surfaces intersecting in a longitudinal direction form an L shape.

3. The liquid crystal display device according to claim 2, wherein
the rail-shaped member further including a third plate section extending downward from the second plate section,
the third plate section covers an edge of the frame, including the lower side of the aperture.

4. The liquid crystal display device according to claim 1, wherein
the rail-shaped member includes a groove which extends in a horizontal direction on a top surface of the rail-shaped member.

5. The liquid crystal display device according to claim 1, wherein the rail-shaped elastic body is affixed to the inner surface of the frame opposing the display surface, in the position below the rail-shaped member, in such a way as to leave the space which is adjacent to the display surface of the liquid crystal display panel between the rail-shaped elastic body and the display surface of the liquid crystal display panel.

6. The liquid crystal display device according to claim 1, wherein the rail-shaped member extends in the horizontal direction and is affixed to the display surface of the liquid crystal panel only at a position below the display area.

* * * * *